US008917688B2

(12) United States Patent
Comeau et al.

(10) Patent No.: US 8,917,688 B2
(45) Date of Patent: Dec. 23, 2014

(54) EFFICIENT USER DETECTION AND CHANNEL ESTIMATION FOR UL COMP

(71) Applicants: Adrien Joseph Comeau, Ottawa (CA); Gary David Boudreau, Kanata (CA)

(72) Inventors: Adrien Joseph Comeau, Ottawa (CA); Gary David Boudreau, Kanata (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 160 days.

(21) Appl. No.: 13/667,053

(22) Filed: Nov. 2, 2012

(65) Prior Publication Data

US 2014/0126480 A1    May 8, 2014

(51) Int. Cl.
| | | |
|---|---|---|
| H04W 4/00 | (2009.01) | |
| H04W 72/04 | (2009.01) | |
| H04W 72/08 | (2009.01) | |
| H04B 7/02 | (2006.01) | |
| H04L 25/02 | (2006.01) | |
| H04L 5/00 | (2006.01) | |

(52) U.S. Cl.
CPC ........ *H04W 72/0426* (2013.01); *H04W 72/087* (2013.01); *H04B 7/024* (2013.01); *H04L 25/0204* (2013.01); *H04L 5/0035* (2013.01); *H04L 5/0094* (2013.01); *H04L 5/0048* (2013.01); *H04L 25/022* (2013.01); *H04L 25/0228* (2013.01)
USPC ....................................................... 370/329

(58) Field of Classification Search
CPC ..... H04W 72/04; H04W 88/08; H04W 80/04; H04W 84/12; H04W 84/08; H04J 3/1682
USPC ......... 370/329, 328, 335, 210, 280, 468, 330, 370/338, 345
See application file for complete search history.

(56) References Cited

U.S. PATENT DOCUMENTS

| | | | |
|---|---|---|---|
| 5,499,243 | A | 3/1996 | Hall |
| 7,773,947 | B2 | 8/2010 | Gerlach |

(Continued)

FOREIGN PATENT DOCUMENTS

| | | |
|---|---|---|
| WO | 2005062494 A1 | 7/2005 |
| WO | 2010034528 A1 | 4/2010 |
| WO | 2012095759 A1 | 7/2012 |

OTHER PUBLICATIONS

Brück, Dr. Stefan, "Backhaul Requirements for Centralized and Distributed Cooperation Techniques," Jul. 8, 2010, Qualcomm CDMA Technologies; 14 pages; http://www.ikr.uni-stuttgart.de/Content/itg/fg524/Meetings/2010-07-08-Heidelberg/09_ITG524_Heidelberg_Brueck.pdf.

(Continued)

*Primary Examiner* — Chi H Pham
*Assistant Examiner* — Alexander O Boakye
(74) *Attorney, Agent, or Firm* — Coats & Bennett, PLLC

(57) ABSTRACT

A channel estimation system disclosed herein jointly estimates the channels for users transmitting signals allocated overlapping frequency resources in a received composite wideband signal. The channel estimation system may further limit the joint channel estimation process to only locally scheduled UEs and those desired users transmitting detectable desired signals using frequency resources at least partially overlapping the locally scheduled UE's frequency resources. More particularly, a local base station processes the received composite wideband signal to determine which of the potential desired user(s) have transmitted user signals allocated frequency resources that at least partially overlap the frequency resources allocated to locally scheduled users and having a sufficient signal strength and quality to be detectable as present in the received signal. The local base station processes the local and detected desired user signals in the received signal to jointly calculate channel estimates for the corresponding users based on the corresponding reference sequences.

43 Claims, 11 Drawing Sheets

(56) References Cited

U.S. PATENT DOCUMENTS

| | | | |
|---|---|---|---|
| 8,644,397 B2 * | 2/2014 | Gaal et al. | 375/259 |
| 8,655,281 B2 | 2/2014 | Wu et al. | |
| 2002/0119780 A1 | 8/2002 | Roux et al. | |
| 2010/0246524 A1 | 9/2010 | Hou et al. | |
| 2011/0293028 A1 | 12/2011 | Panicker et al. | |
| 2012/0184218 A1 | 7/2012 | Boudreau et al. | |

OTHER PUBLICATIONS

Bourdreau, G. et al. "Distributed V-MIMO Processing for Coordinated Multipoint Reception." U.S. Appl. No. 13/661,360, filed Oct. 26, 2012.

Irmer, R., et al., "Coordinated Multipoint: Concepts, Performance, and Field Trial Results", IMT-Advanced and Next-Generation Mobile Networks, IEEE Communications Magazine, Feb. 1, 2011, pp. 102-111, vol. 49, No. 2, XP055003502.

Fujitsu, "An Efficient Reference Signal Design in LTE Advanced", 3GPP TSG-RAN1 #56, Feb. 9, 2009, pp. 1-13, Athens, Greece, R1-090949.

Wild, T., et al., "Joint Channel Estimation across Multiple Cells in Coordinated Multi-Point", 2012 International Symposium on Wireless Communication Systems (ISWCS), IEEE, Aug. 28, 2012, pp. 845-849, XP032263879.

Nokia Siemens Networks, et al., "On DM RS Enhancements for UL CoMP", 3GPP TSG RAN WG1 Meeting #68, Feb. 6, 2012, pp. 1-7, Dresden, Germany, R1-120727.

Comeau, A. "Adaptive Uplink Coordinated Multipoint Communication for Backhaul." U.S. Appl. No. 13/587,592, filed Aug. 16, 2012.

* cited by examiner

EFFICIENT USER DETECTION AND CHANNEL ESTIMATION FOR UL COMP

BACKGROUND

Coordinated Multipoint (CoMP) transmission/reception is used in 3$^{rd}$ Generation Partnership Project (3GPP) networks to improve coverage, cell throughput, and/or system efficiency. In general, a mobile device, referred to herein as a UE, may be able to receive signals from and send signals to multiple cell sites. Given such a multiple-input, multiple-output (MIMO) setup, performance may be improved if the cell sites coordinate signaling transmissions and/or scheduling decisions. For example, downlink (DL) CoMP may coordinate signaling transmissions from multiple cell sites to a UE to improve interference avoidance. In another example, uplink (UL) CoMP may coordinate scheduling from different cell sites to take advantage of the multiple signals received at the multiple cell sites from a single UE, and therefore to significantly improve the link performance.

With UL CoMP, a serving cell schedules the UL transmissions for all UEs reporting to that serving cell. When transmissions from one or more of the UEs are also received by one or more neighboring cells with sufficient quality, the serving cell may request that these neighboring cells operate as cooperator cells that cooperate with the serving cell. It will be appreciated that a single cooperator cell may receive multiple distinct requests from multiple different serving cells, where the potential cooperator cell must efficiently decide which serving cells to cooperate with. Preferably, these decisions should be made so as to maximize the benefits achieved with CoMP pair-wise (serving-cooperator) interactions, and to minimize the probability of error.

It will be appreciated that one of the problems associated with UL CoMP stems from the fact that a particular cell, e.g., a cooperator cell, receives signals from both its own UEs (e.g., locally scheduled UEs) as well as from the UEs reporting to other serving cells (e.g., desired UEs). Because the cooperator cell has no control over the resources granted to the desired UEs, the Demodulation Reference Signal (DMRS) sequences of the locally scheduled and desired UEs are not guaranteed to be orthogonal and are not aligned in frequency in any special or predictable way. As a result, the desired UEs' signals are highly likely to interfere with signals from the cooperator cell's locally scheduled UEs. Further, simple serving-cooperator pairs are not guaranteed because three or more UEs, e.g., one locally scheduled UE and two or more desired UEs, may be using the same resources. Thus, channel estimates derived for the locally scheduled UEs and the desired UEs based on the corresponding DMRSs may not be sufficiently accurate. These inaccuracies are problematic because accurate channel estimates are necessary to fully enable the performance of a receiver. Further, because of the potential for overlapping DMRSs, the reliability (quantified as the probability of a miss and/or a false alarm) of the conventional DMRS-based decision making solution for CoMP systems is compromised.

Thus, there remains a need for improved channel estimation techniques for UL CoMP systems that introduce an efficient and reliable detection solution.

SUMMARY

The channel estimation system disclosed herein addresses these issues by jointly estimating the channels for users transmitting signals allocated overlapping frequency resources in a received composite wideband signal. The channel estimation system further addresses these issues by limiting the joint channel estimation process to only locally scheduled UEs and those desired users transmitting detectable desired signals using frequency resources at least partially overlapping the locally scheduled UE's frequency resources. More particularly, the local base station processes the received composite wideband signal to determine which of the potential desired user(s) reporting to neighboring base station(s) have transmitted user signals allocated frequency resources that at least partially overlap the frequency resources allocated to locally scheduled users and having a sufficient signal strength and quality to be detectable as present in a received signal. The local base station subsequently processes the local and detected desired user signals in the composite wideband signal to jointly calculate channel estimates for the corresponding users based on the corresponding reference sequences. More particularly, a system of M equations having N unknowns, M≥N, may be solved for each of N user signals using the same frequency resource to jointly calculate the channel estimates.

An exemplary method of processing a composite wideband signal received at a local base station is disclosed herein, where the composite wideband signal includes, over one or more frequency groups or clusters of resource blocks, at least one local signal associated with a locally scheduled user and at least one desired signal associated with a desired user scheduled by a neighboring base station, where the local base station receives scheduling information for the at least one desired user from the corresponding neighboring base stations. The method comprises estimating a combined local signal comprising all local signals in the composite wideband signal based on local scheduling information, wherein the local scheduling information allocates a unique set of local frequencies to each of the locally scheduled users, the received scheduling information allocates a set of desired frequencies to each of the desired users, and at least one of the sets of desired frequencies at least partially overlaps at least one of the sets of local frequencies. The method further comprises subtracting the combined local signal from the composite wideband signal to generate a combined desired signal, and detecting one or more of the desired signals in the composite wideband signal based on the combined desired signal and desired reference sequences allocated to the one or more desired users as indicated by the received scheduling information.

An exemplary desired user detector in a local base station comprises a combined local signal estimator, a subtractor, and a detection processor. The combined local signal estimator is configured to estimate a combined local signal comprising all local signals in the composite wideband signal based on local scheduling information, wherein the local scheduling information allocates a unique set of local frequencies to each of the locally scheduled users, the received scheduling information allocates a set of desired frequencies to each of the desired users, and at least one of the sets of desired frequencies at least partially overlaps at least one of the sets of local frequencies. The subtractor is configured to subtract the combined local signal from the composite wideband signal to generate a combined desired signal. The detection processor is configured to detect one or more of the desired signals in the composite wideband signal based on the combined desired signal and desired reference sequences allocated to the one or more desired users as indicated by the received scheduling information.

Another exemplary method of processing a composite wideband signal received at a local base station is disclosed herein, where the composite wideband signal includes a plurality of user signals, each spanning a frequency group or cluster of resource blocks, where the frequency groups of different user signals at least partially overlap, and where the local base station has scheduling information for each of the user signals. The method comprises, based on the scheduling information, identifying a first frequency bin of the composite wideband signal and determining a number of user signals present in the composite wideband signal in the first frequency bin. The method further comprises identifying at least one additional, contiguous frequency bin in which the same user signals are present in the composite wideband signal such that the total number of identified frequency bins is greater than or equal to the number of user signals in the first frequency bin. Over the identified contiguous frequency bins, the method includes jointly calculating channel estimates for each of the user signals in the first frequency bin based on reference sequences allocated to the users corresponding to the user signals in the first frequency bin.

A joint channel estimator configured to process a composite wideband signal received at a local base station comprises a frequency bin identification processor and a scanning estimator. The frequency bin identification processor is configured to, based on the scheduling information identify a first frequency bin of the composite wideband signal and determining a number of user signals present in the composite wideband signal in the first frequency bin. The frequency bin identification processor is further configured to identify at least one additional, contiguous frequency bin in which the same user signals are present in the composite wideband signal such that the total number of identified frequency bins is greater than or equal to the number of user signals in the first frequency bin. The scanning estimator is configured to, over the identified contiguous frequency bins, jointly calculate channel estimates for each of the user signals in the first frequency bin based on reference sequences allocated to the users corresponding to the user signals in the first frequency bin.

Another exemplary method of processing a composite wideband signal received at a local base station is disclosed herein, where the composite wideband signal including, over one or more frequency groups, at least one local signal associated with a locally scheduled user and at least one desired signal associated with a desired user scheduled by a neighboring base station, where the local base station receives scheduling information for the at least one desired user from the corresponding neighboring base stations, and where the frequency groups of different user signals at least partially overlap. The method comprises generating smoothed channel estimates for each of the locally scheduled users having a local signal in the composite wideband signal based on local reference sequences respectively allocated to each locally scheduled user by the local scheduling information. The method also comprises detecting one or more of the desired signals in the composite wideband signal based on the smoothed channel estimates and on desired reference sequences respectively allocated to each desired user. Over each frequency region having one or more overlapping frequency groups containing signals transmitted by a unique set of users, the method includes jointly calculating channel estimates for each of the user signals in the frequency region based on the corresponding allocated reference sequences.

A channel estimation system configured to process a composite wideband signal received at a local base station comprises a desired user detector and a joint channel estimator. The desired user detector is configured to generate smoothed channel estimates for each of the locally scheduled users having a local signal in the composite wideband signal based on local reference sequences respectively allocated to each locally scheduled user by the local scheduling information. The desired user detector is further configured to detect one or more of the desired signals in the composite wideband signal based on the smoothed channel estimates and on desired reference sequences respectively allocated to each desired user. The joint channel estimator is configured to, over each frequency region having one or more overlapping frequency groups containing signals transmitted by a unique set of users, jointly calculate channel estimates for each of the user signals in the frequency region based on the corresponding allocated reference sequences.

An exemplary method of allocating reference sequences to each of a plurality of users in a wireless communication network is also disclosed herein, where each of the plurality of users allocated one or more resource blocks within a transmission block by scheduling information corresponding to each user, and where one or more of the allocated resource blocks for different users overlap. The method comprises defining a plurality of intervals within the transmission block, wherein different intervals comprise different combinations of two or more users granted overlapping resource blocks, and wherein each interval has an interval length equal to the number of contiguous resource blocks in the interval. For each interval, the method includes allocating a different subsequence to each user in the interval, each allocated subsequence having a subsequence length equal to the interval length. The method also comprises generating a reference sequence for each user based on the allocated subsequence(s).

A reference sequence allocator configured to allocate reference sequences to each of a plurality of users in a wireless communication network is disclosed herein. The reference sequence allocator comprises a processor configured to define a plurality of intervals within the transmission block, wherein different intervals comprise different combinations of two or more users granted overlapping resource blocks, and wherein each interval has an interval length equal to the number of contiguous resource blocks in the interval. For each interval, the processor is configured to allocate a different subsequence to each user in the interval, each allocated subsequence having a subsequence length equal to the interval length. The processor is further configured to generate a reference sequence for each user based on the allocated subsequence(s).

DETAILED DESCRIPTION

Figure 1:
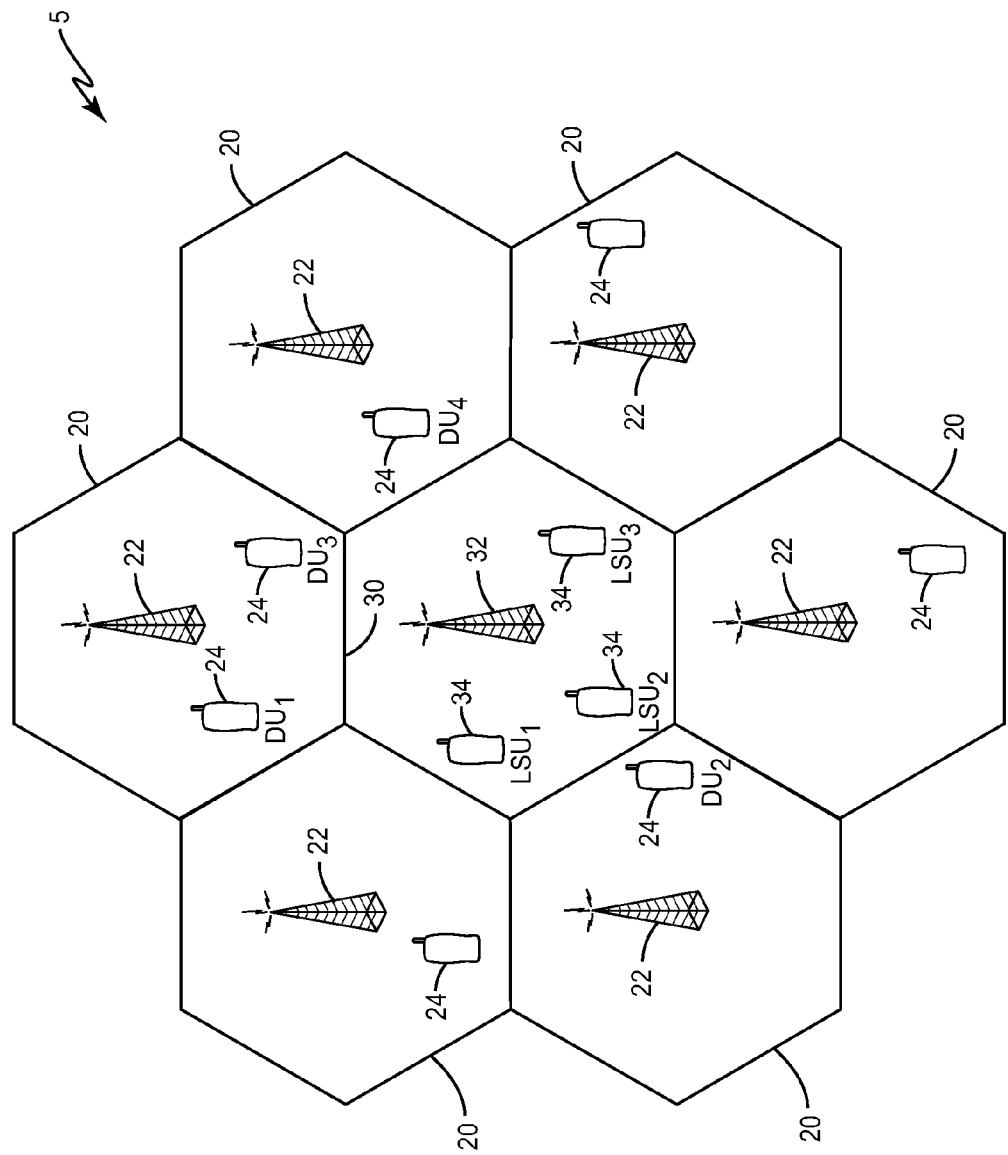
FIG. 1 shows an exemplary wireless network.

FIG. 1 shows an exemplary UL CoMP wireless communication system 5 comprising multiple "serving" cells 20 and one "cooperator" cell 30 neighboring the serving cells 20. In this example, each serving cell 20 includes multiple UEs 24 reporting to a serving base station 22, where each UE 24 transmits uplink signals to the serving base station 22. The signals transmitted by the UEs 24 may also be received by a neighboring base station 32 in a neighboring cell 30. When such transmissions are received by the neighboring base station 32 with sufficient quality, the neighboring base station/neighboring cell may operate as a cooperator base station 32/cooperator cell 30. In general, a potential cooperator base station may receive requests for help from one or more "serving" base station for assistance helping some UEs reporting to the serving base station(s), even if the cooperator base station is not actually receiving signals from some number of those UEs. Thus, the cooperator cell/base station must decide which requests it can actually help with, e.g., by determining which UE signals it actually can detect. While the system 5 of FIG. 1 only shows seven cells, it will be appreciated that system 5 may include any number of serving cells 20, cooperator cells 30, etc. Further, it will be appreciated that any of the "serving cells" 20 in FIG. 1 may operate as cooperator cells, and that the "cooperator cell" 30 is a serving cell for its locally scheduled UES.

Figure 2:
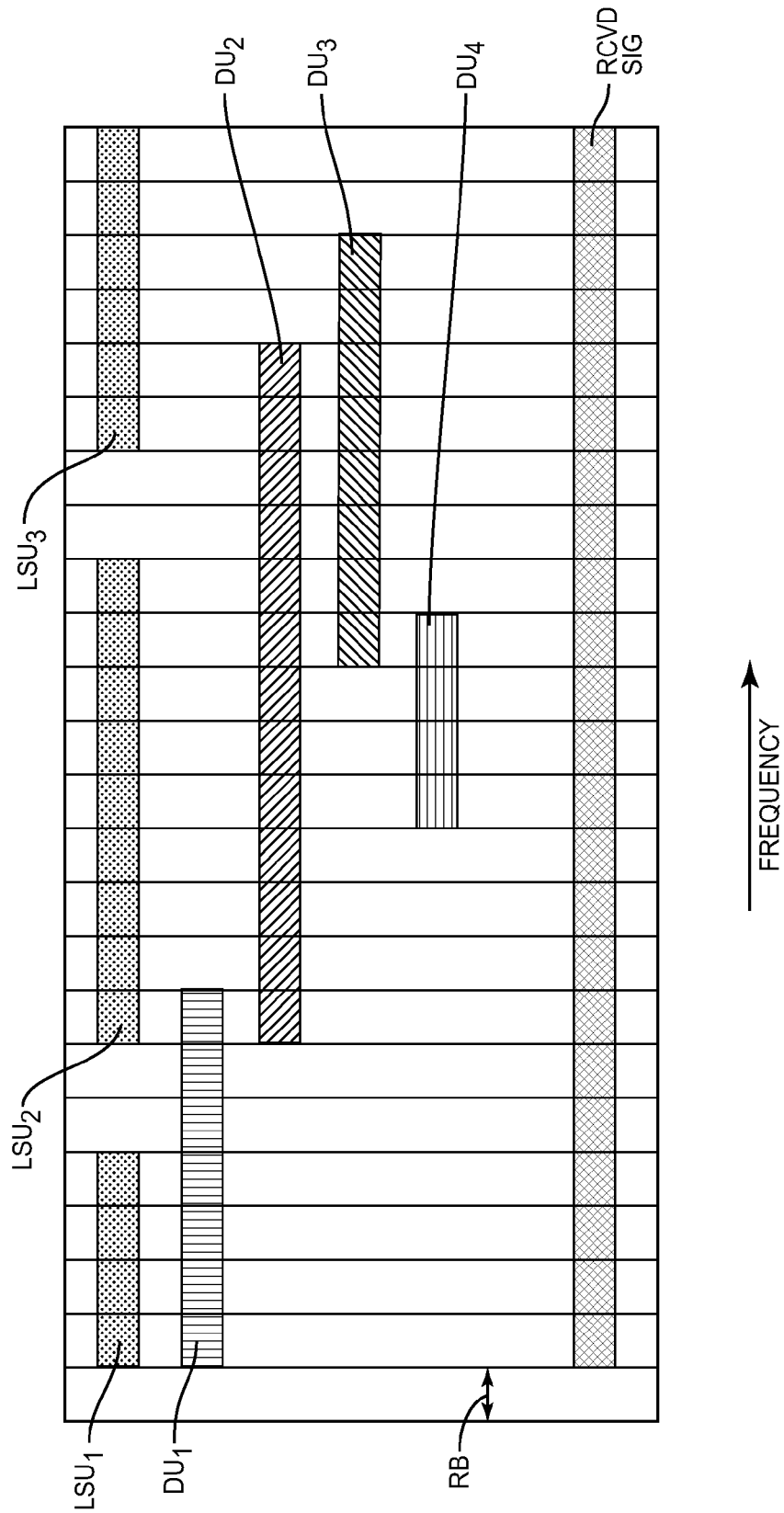
FIG. 2 shows the makeup of an exemplary UL CoMP signal.

The channel estimation system disclosed herein is implemented in the cooperator base station 32 of the cooperator cell 30 to determine channel estimates for locally scheduled UEs 34 reporting to the cooperator base station 32, as well as for desired UEs 24 reporting to a base station 22 in a cell neighboring the cooperator cell 30. FIG. 2 shows how a composite wideband signal received at the cooperator base station 32 comprises multiple signals received from different UEs, e.g., the locally scheduled UEs 34 and the desired UEs 24. In this example, cooperator cell 30 includes three locally scheduled UEs 34: $LSU_1$, $LSU_2$, and $LSU_3$, each of which are allocated a local reference sequence and some number of resource blocks (RBs) by base station 32, where each resource block includes some number of frequency bins, e.g., twelve frequency bins per subframe. In addition, base station 32 receives signals from some number of UEs 24 reporting to base stations 22, including desired UEs 10: $DU_1$, $DU_2$, $DU_3$, and $DU_4$, each of which are allocated a desired reference sequence and some number of resource blocks by its serving base station 22. As shown in FIG. 2, one or more of the desired UEs 24 may use the same resources as one or more of the locally scheduled UEs 34. Further, the locally scheduled UEs 34 and the desired UEs 24 are not necessarily orthogonal and/or aligned in frequency in any special or predictable way. As a result, the signals transmitted by the desired UEs 24 will interfere with signals transmitted by the cooperator cell's locally scheduled UEs 34. Such overlapping resources and interference may compromise the accuracy of any channel estimates determined using conventional techniques.

Figure 3:
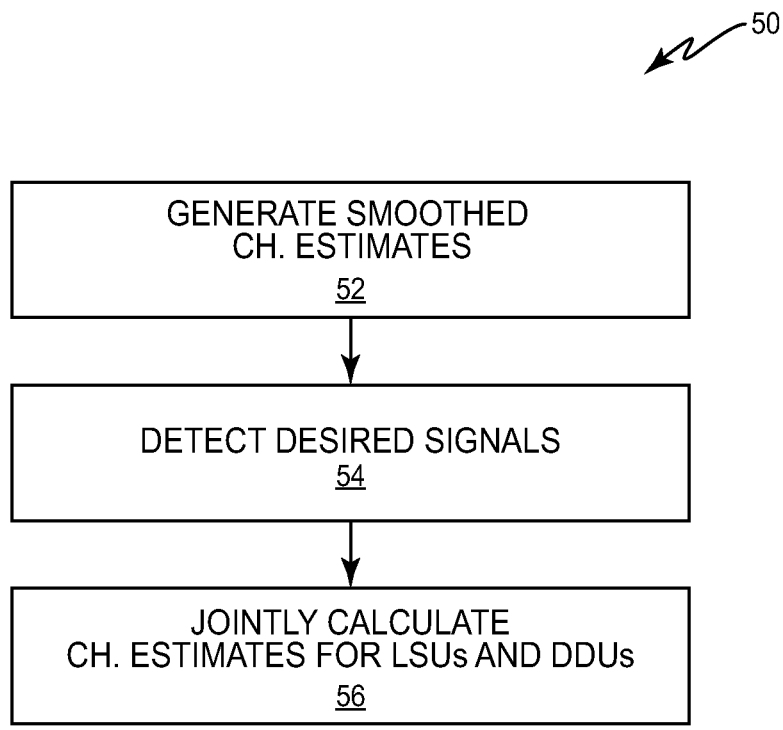
FIG. 3 shows a channel estimation method according to one exemplary embodiment.
Figure 4:
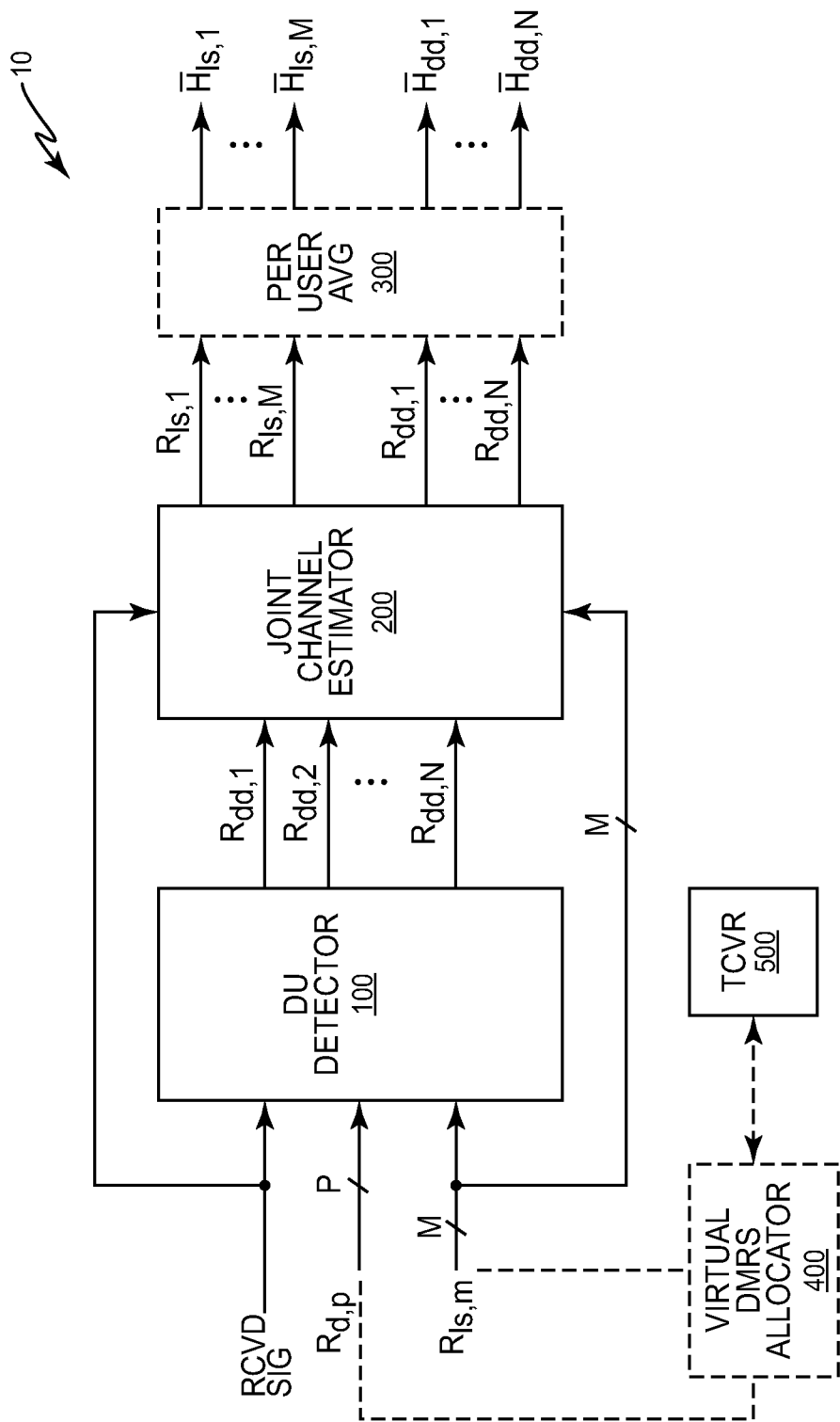
FIG. 4 shows a block diagram for a channel estimation system according to one exemplary embodiment.

The channel estimation system disclosed herein seeks to overcome these issues to determine accurate channel estimates for the locally scheduled UEs 34 and the desired UEs 24 according, e.g., to the method 50 shown in FIG. 3 as implemented by the channel estimation system 10 of FIG. 4. Accordingly, the channel estimation system generates smoothed channel estimates for each of the locally scheduled user signals in the received composite wideband signal based on the local reference sequences allocated to the locally scheduled UEs 34 by base station 32 (block 52). Based on the smoothed channel estimates and the desired reference sequences allocated to the potential desired UEs 24 by base station(s) 22, the channel estimation system 10 detects one or more of the desired user signals (block 54). Over each frequency region having one or more overlapping frequency groups containing signals transmitted by a unique set of users, where each frequency block corresponds to a resource block, the channel estimation system 10 subsequently jointly calculates channel estimates for each of the local and detected desired user signals in the frequency region based on the corresponding reference sequences (block 56).

FIG. 4 shows one exemplary channel estimation system 10 for UL CoMP implemented in a cooperator cell base station 32 or other network component associated with the cooperator cell 30. System 10 comprises a desired UE detector 100, a joint channel estimator 200, and an optional averaging unit 300 collectively configured to execute the method 50 of FIG. 3. Desired UE detector 100 receives a composite wideband signal ($S_{rcvd}$) containing signals from M locally scheduled UEs 34 and P potential desired UEs 24. It will be appreciated that base station 32 knows the resource blocks and reference sequences (e.g., the demodulation reference signal (DMRS) sequences) it allocated to the locally scheduled UEs 34. It will further be appreciated that the base station 32 receives scheduling information from the serving base stations 22 requesting cooperator assistance, where the received scheduling information identifies the resource blocks and reference sequences allocated to the P potential desired UEs 24. For those potential desired UEs allocated frequency resources at least partially overlapping the frequency resources allocated to the locally scheduled UEs 34, detector 100 detects which of the P potential desired UEs 10 have sufficient signal strength and signal quality to be detectable/present in a received signal based on smoothed channel estimates derived from the reference sequences allocated to the desired UEs 24 ($R_{d,p}$) and the locally scheduled UEs 34 ($R_{ls,m}$). The detector 100 outputs the reference sequences for the N (N≤P) detected desired UEs, $R_{dd,n}$. In the examples shown in FIGS. 1 and 2, there are M=3 locally scheduled UEs 34, P=7 potential desired UEs 24, and N=4 detected desired UEs 24. Joint channel estimator 200 jointly estimates the channels ($H_{dd,n}$, $H_{ls,m}$) between the base station 32 and the detected desired and locally scheduled UEs 24, 34 by jointly processing the signals allocated to overlapping frequencies based on the reference sequences for the locally scheduled UEs 34 and the detected desired UEs 24. Optional averaging unit 300 comprises individual averagers, one for each user signal, that each average the channel estimates output by the joint channel estimator 200 for a particular UE to determine a smoothed channel estimate for each of the M locally scheduled UEs ($\overline{H}_{ls,m}$) and each of the N detected desired UEs ($\overline{H}_{dd,n}$). While not required, the averaging unit 300 improves the overall performance of the channel estimation system 10.

Figure 5:
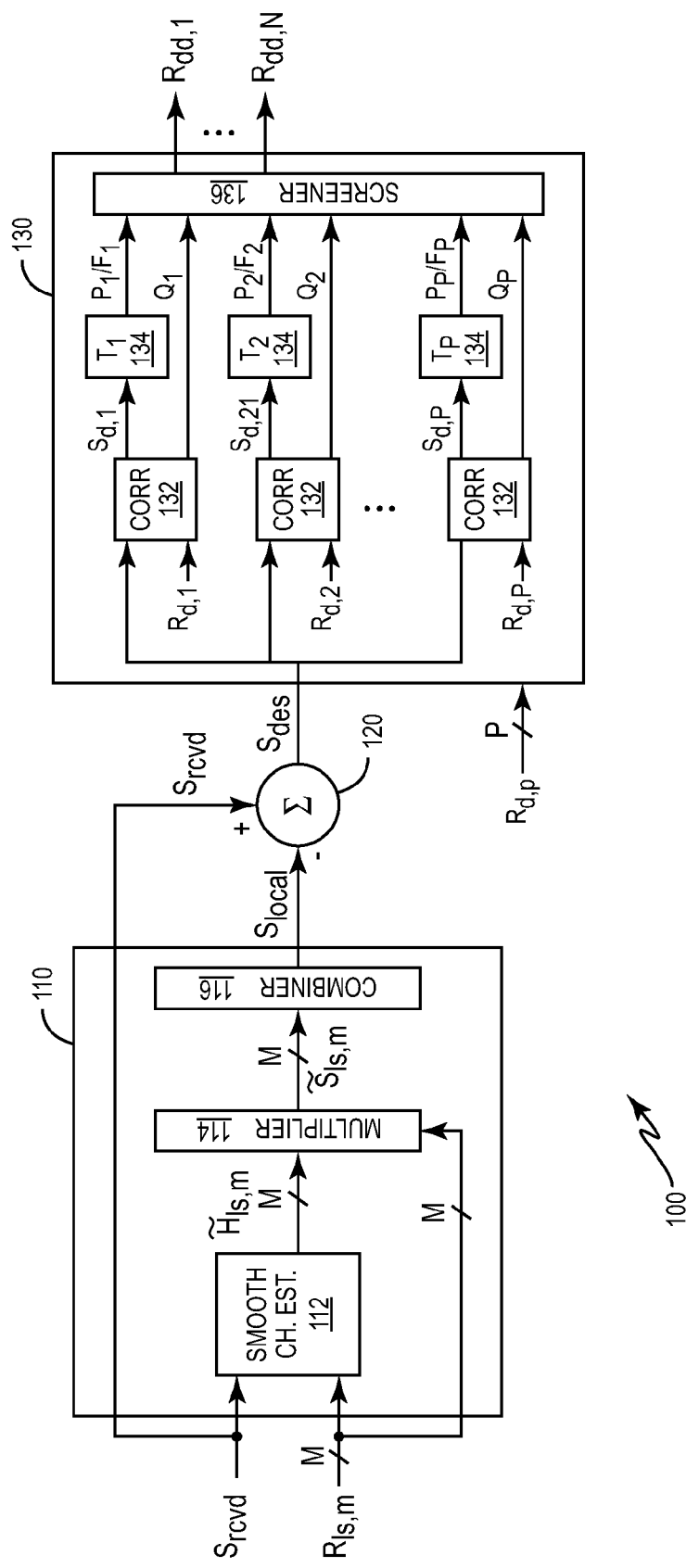
FIG. 5 shows an exemplary block diagram for the desired user detector of FIG. 4.
Figure 6:
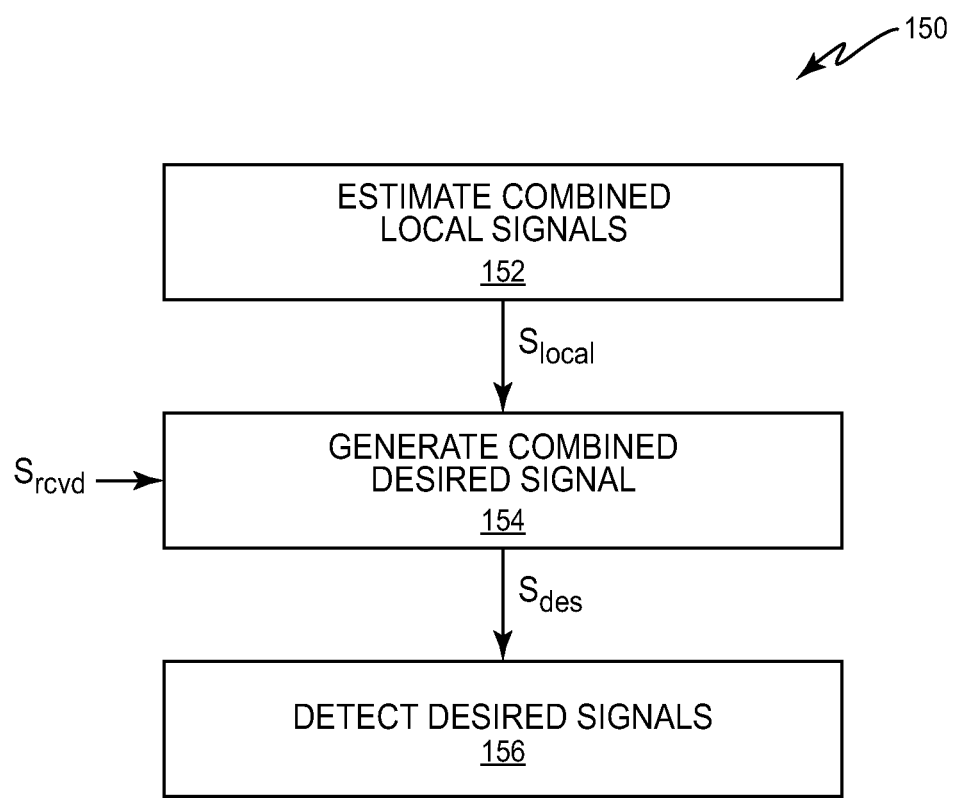
FIG. 6 shows a desired user detection method according to one exemplary embodiment.

FIG. 5 shows one exemplary block diagram for the desired UE detector 100 of FIG. 4, which is configured to execute the process 150 of FIG. 6. More particularly, the detector 100 is configured to estimate a combined local signal comprising all of the local signals in the composite wideband signal based on the local scheduling information (block 152). By subtracting the combined local signal from the received signal, detector 100 generates a combined desired signal (block 154). The detector 100 detects one or more of the desired signals based on the combined desired signal and the desired reference sequences (block 156).

To that end, detector 100 comprises a combined local signal estimator 110, a subtractor 120, and a detection processor 130. Combined local signal estimator 110 estimates a combined local signal $S_{local}$ by combining all locally scheduled UE signals in the received signal $S_{rcvd}$ that potentially overlap in frequency with a desired UE signal present. To that end, estimator 110 comprises a smooth channel estimator 112, multiplier 114, and combiner 116. Smooth channel estimator 112 generates smooth channel estimates $\tilde{H}_{ls,m}$ for each of the M locally scheduled UEs 34 over the domain of all of the locally scheduled UE signals based on the local reference sequences allocated to the locally scheduled UEs 24 allocated frequency resources overlapping the frequency resources allocated to at least one potential desired UE 34. For example, smooth channel estimator 112 may determine channel estimates for each tone of a resource block, transform these estimates into the time domain to estimate the channel impulse response, truncate this impulse response in some appropriate way, and then transform the truncated response back into the frequency domain. The resulting channel estimates are thus smoothed, and reflect the expectation of a timed channel impulse response. Multiplier 114 multiplies each smoothed channel estimate by the corresponding local reference sequence $R_{ls,m}$ to compute an estimate of the received signal for each of the M locally scheduled UE ($S_{ls,m}$). Combiner 116 combines the estimated received signals for the locally scheduled UEs 34 to generate the combined local signal $S_{local}$. Subtractor 120 subtracts the combined local signal $S_{local}$ from the received signal $S_{rcvd}$ to generate a combined desired signal $S_{des}$ free of the locally scheduled user signals.

Detection processor 130 processes the combined desired signal to detect which of the P potential desired UEs 24, e.g., the desired UEs 24 allocated frequency resources that overlap the allocated frequency resources of the locally scheduled UEs 34, have a signal sufficiently present in the received signal. To that end, detection processor 130 comprises a plurality of correlators 132, a plurality of threshold processors 134, and a screening unit 136. For the example of FIG. 1, the detection processor 130 uses P=7 correlators 132 and =7 threshold processors 134. It will be appreciated, however, that detection processor 130 may comprise any number of correlators 132 and processors 134.

Each correlator 132 generates a desired UE signal ($S_{ap}$) and a corresponding quality estimate ($Q_p$) by cross-correlating $S_{des}$ with a different one of the P desired reference sequences $R_{d,p}$. Each threshold processor 134 applies a threshold condition to the input desired UE signal. If the input desired UE signal passes the threshold test, e.g., if an amplitude of the input desired UE signal $S_{d,p}$ exceeds the threshold $T_p$, threshold processor 134 provides a "pass" signal ($P_p$) to the screening unit 136. Otherwise the threshold processor 134 provides a "fail" signal ($F_p$) to the screening unit 136. Based on the pass/fail signals from the threshold processors 134 and the quality estimates from the correlators 132, screening unit 136 detects the N≤P desired UEs 24 having a signal present in the received signal that also overlaps at least one frequency resource of at least one of the locally scheduled UE signals, and outputs the reference sequences ($R_{dd,n}$) for these detected desired UEs 24. More particularly, screening unit 136 outputs the reference sequences for those desired user signals that pass the threshold condition and have a quality estimate satisfying a quality condition.

Figure 7:
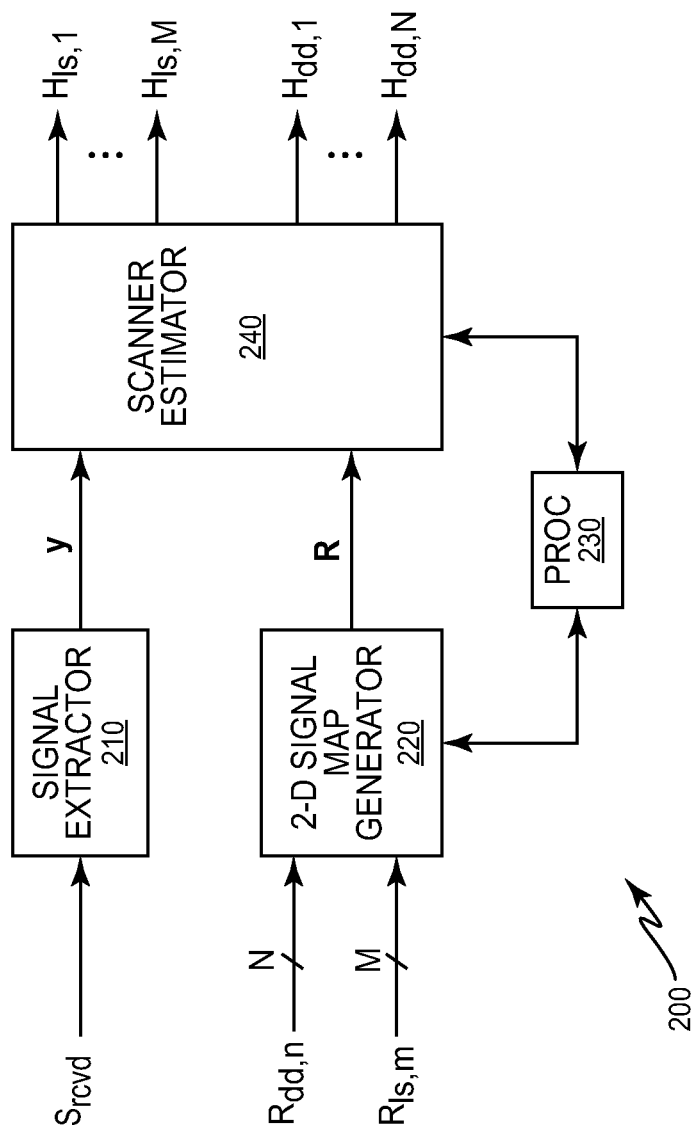
FIG. 7 shows an exemplary block diagram for the joint channel estimator of FIG. 4.
Figure 8:
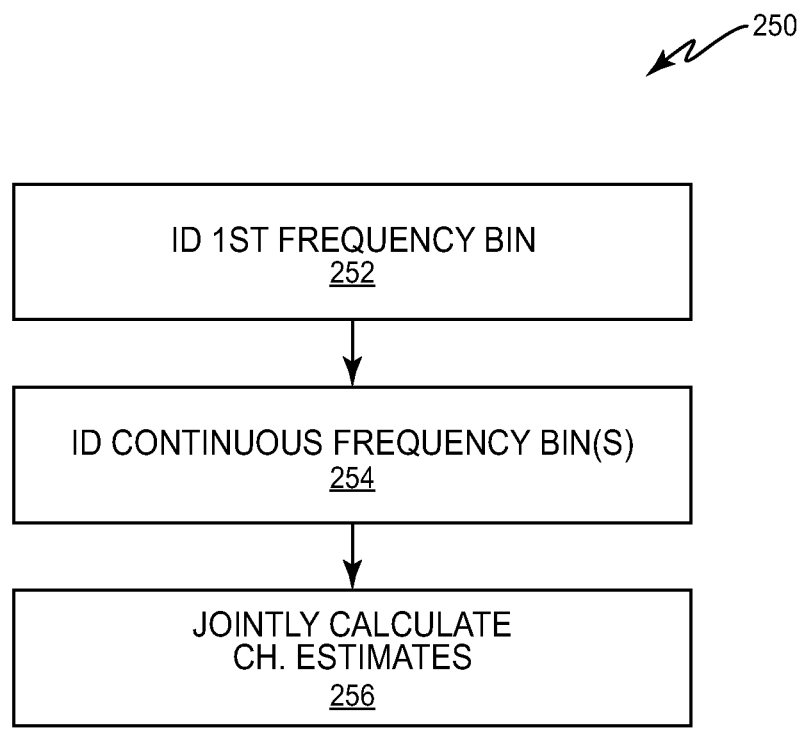
FIG. 8 shows a joint channel estimation method according to one exemplary embodiment.

FIG. 7 shows a block diagram of an exemplary joint channel estimator 200 configured to jointly estimate the channels ($H_{dd,n}$, $H_{ls,m}$) between the base station 32 and the detected desired and locally scheduled UEs 24, 34 according to the method 250 of FIG. 8. To that end, joint channel estimator 200 identifies a first frequency bin of the composite wideband signal and determines the number of user signals present in the first frequency bin (block 252). The joint channel estimator 200 also identifies at least one more contiguous frequency bin in which the same user signals are present, such that the total number of identified frequency bins is at least as large as the number of user signals in the first frequency bin (block 254). Joint channel estimator 200 then jointly calculates channel estimates, over the identified frequency bins, for each of the user signals in the first frequency bin based on the reference sequences allocated to the UEs having signals in the first frequency bin (block 256).

To that end, the joint channel estimator 200 comprises a signal extractor 210, a two-dimensional signal map generator 220, a processor 230, and a scanning estimator 240. Signal extractor 210 generates a composite signal vector y (relative to frequency) over the domain of all of the received cooperator requests received by the cooperator base station 32. The composite signal vector y represents the received signal over the frequency group of interest, and includes the composite received data of all UEs in that frequency group.

Figure 9:
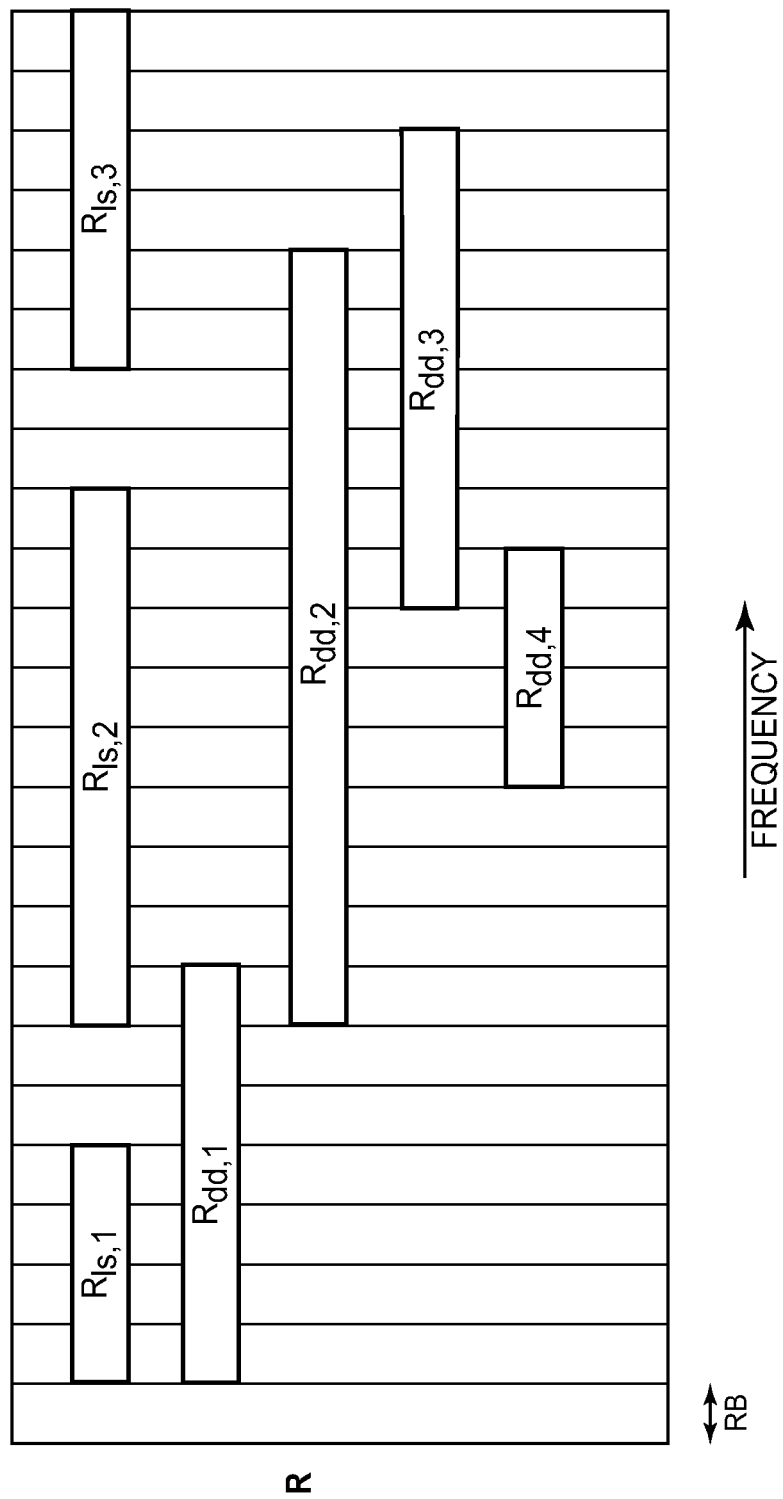
FIG. 9 show an exemplary distribution of DMRS sequences for multiple locally scheduled and desired UEs.

Two-dimensional signal map generator 220 generates a matrix of reference sequence samples (R) containing each of the reference sequences' samples allocated to the M locally scheduled UEs 34 and the N detected desired UEs 24 relative to each of the resource blocks allocated to the locally scheduled and detected desired UEs. Each resource block comprises a predetermined number of frequency bins, including but not limited to twelve frequency bins. The two-dimensional signal map generator 220 generates R based on the scheduling information known for the locally scheduled UEs 34 and the detected desired UEs 24. FIG. 9 visually represents the reference sequence matrix corresponding to the M=3 locally scheduled and N=4 detected desired UEs for the received signal of FIG. 2. Processor 230 scans through the frequency bins of the input signal corresponding to the frequency bins of the reference sequence matrix to identify the frequency bins/resource blocks having a unique set of user signals. More particularly, processor 230 identifies, for a first frequency bin of a first resource block of the reference sequence matrix, how many user signals are present in the first frequency bin. Processor 230 further identifies a number of additional contiguous frequency bins in which the same user signals are present. Thus, processor 230 identifies B contiguous frequency bins, including the first frequency bin, where B equals the determined number of user signals in the first frequency bin. Scanning estimator 240 then processes the composite wideband signal vector over B frequency bins, e.g., the first frequency bin and the subsequent B−1 contiguous frequency bins, to generate and solve B equations for the B unknown channel estimates of the B users using any known technique, e.g., minimum mean squared error (MMSE) techniques. For example, the B channel estimates may be determined according to $h=(R^T R)^{-1} R^T y$ where h represents a vector of the B channel estimates and $R^T$ represents the transpose of R. In the exemplary reference sequence matrix of FIG. 9, two UEs are present in the first frequency bin. Thus, scanning estimator 230 sets B=2, generates two equations containing two unknowns, and solves the two equations for the two unknown channel estimates of the first frequency bin region for $LU_1$ and $DDU_1$. In another example, four UEs are using the same frequency resources in the $15^{th}$ resource block of FIG. 9. Thus, scanning estimator 240 generates at least four equations with four unknowns, and solves the four equations for the four unknown channel estimates of a particular frequency bin for $LU_2$, $DDU_2$, $DDU_3$, and $DDU_4$. The scanning estimator 240 therefore generates a channel estimate for each frequency bin of the reference sequence matrix. In one embodiment, the scanning estimator 240 repeats this process for each frequency bin of the composite signal vector to determine channel estimates for the signals in each frequency bin. In another embodiment, the scanning estimator 240 may repeat this process for each bin containing a UE signal for which a channel estimate has not been calculated.

It will be appreciated that the scanning estimator 240 processes the composite wideband signal over contiguous frequency bins, which may comprise the first frequency bin plus the B−1 additional frequency bins. In addition, in some embodiments the scanning estimator 230 may identify $B+B_{extra}$ frequency bins to over-dimension the number of equations, and therefore, to increase the probability that the system of equations is solvable.

Further, issues may arise at boundary resource blocks where it is not possible to select B−1 subsequent frequency bins. In this case, the channel estimate(s) for the boundary frequency bins may be set equal to a channel estimate previously determined for signals in an adjacent frequency bin. For example, the scanning estimator 240 will be unable to generate two equations for the two unknowns associated with the last frequency bin of the $5^{th}$ resource block. Thus, the scanning estimator 240 may set the channel estimates for the last frequency bin of the $5^{th}$ resource block equal to the channel estimates determined for the penultimate frequency bin of the $5^{th}$ resource block. Similarly, the scanning estimator 240 may set the channel estimates for the last two frequency bins of the $8^{th}$ resource block equal to the channel estimates determined for the $10^{th}$ frequency bin.

The joint channel estimator 200 of the channel estimation system 10 operates on the locally scheduled UEs 34 and the detected desired UEs 24. It will be appreciated, however, that the joint channel estimator 200 may alternatively operate on a received signal containing signals for any UEs allocated overlapping resource blocks. Thus, the disclosed joint channel estimator 200 may operate independently from the desired user detector 100.

The channel estimation system 10 disclosed herein improves the accuracy of channel estimates determined for locally scheduled UEs 34 and desired UEs 24. Further, because the channel estimation system 10 may focus on determining channel estimates for locally scheduled UEs 34 and detected desired UEs 24, the disclosed channel estimation system 10 eliminates the wasteful use of processing resources required of some prior art solutions.

Simulation results indicate using the desired user detector and/or joint channel estimator disclosed herein provides significant performance improvements over conventional solutions. For example, consider the scenario where the desired user signal is 20 dB below the locally scheduled user signal. The probability of missed detection and the probability of false alarm are 80% and 1%, respectively, when using conventional detection techniques, e.g., using the reference sequences, to detect user signals in the composite wideband signal. When using the detection technique disclosed herein, e.g., based on locally scheduled UE cancellation, the probability of missed detection and the probability of false alarm are 5% and 1%, respectively. When using the detection technique disclosed herein with a two antenna diversity system, the probability of missed detection and the probability of false alarm are estimated to be 0.25% and 2%, respectively. Further, the $50^{th}$ percentile channel estimation error is improved by 20 dB.

As disclosed herein, the channel estimation process relies on reference sequences allocated to the locally scheduled UEs 34 and the detected desired UEs 24. Conventional systems typically allocate reference sequences that span the resource blocks allocated to a particular UE, as shown in FIG. 9. Zadoff-Chu sequences, e.g., are commonly used for this purpose. In general, as permitted by the LTE standard, the allocated Zadoff-Chu sequences are chosen from sets of Zadoff-Chu sequences to achieve good auto-correlation properties for detection of the desired users' reference sequences (e.g., for good probability of detection), as well as to achieve good cross-correlation properties to avoid falsely detecting a reference sequence from another user (e.g., low probability of false alarm). One of the properties of ZC is that the auto-correlation and cross-correlation properties are generally good when calculated over the entire length of the sequence. However, the correlation properties, particularly the cross-correlation properties, tend to degrade when Zadoff-Chu sequences are correlated over shorter sections of a full sequence. In order to help mitigate this effect, one embodiment may allocate reference sequences comprising multiple shorter reference sequences, e.g., virtual DMRS sequences, to each locally scheduled UE and/or detected desired UE.

Figure 10:
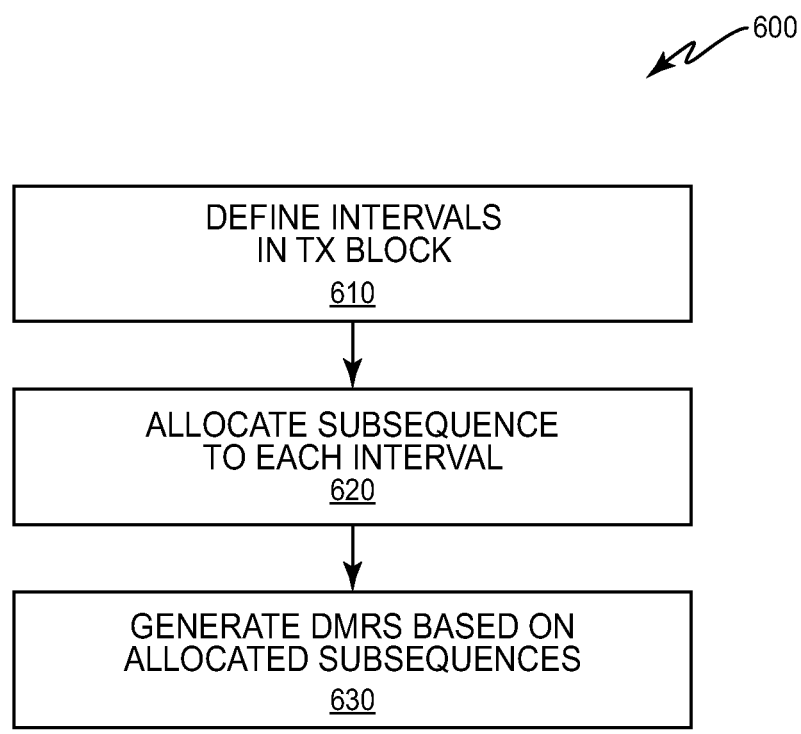
FIG. 10 shows a reference sequence allocation method according to one exemplary embodiment.
Figure 11:
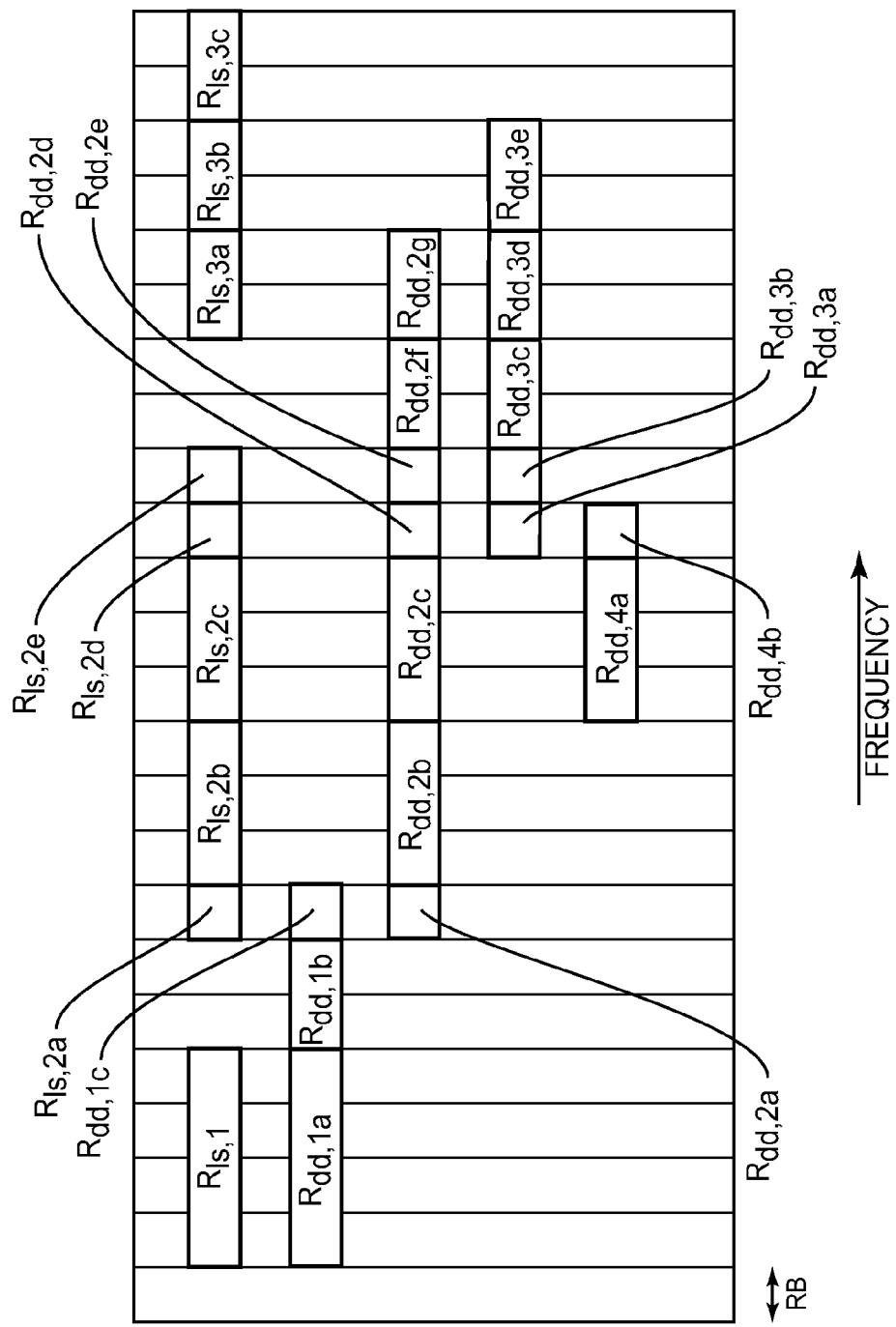
FIG. 11 shows an exemplary distribution of virtual DMRS sequences for multiple locally scheduled and desired UEs according to one exemplary embodiment.

FIG. 10 shows an exemplary method 600 for allocating reference sequences comprising multiple concatenated reference subsequences, as shown in FIG. 11. In this example, each subsequence length is defined based on the number of resource blocks being allocated to the same UEs. In particular, a virtual DMRS allocator 400 in the local base station 32 (FIG. 4) defines intervals in a transmission block, e.g., a transmission time interval, where each interval has an interval length equal to the number of contiguous resource blocks in the interval (block 610). Different intervals comprise different combinations of two or more users granted overlapping resource blocks. For each interval, allocator 400 allocates a different subsequence to each user in the interval, where each allocated subsequence has a subsequence length equal to the interval length (block 620). The allocator 400 subsequently generates the reference sequence for each user based on the allocated subsequences (block 630).

For example, as shown in FIG. 11, resource blocks 2-5 are allocated to $LSU_1$ and $DDU_1$, resource blocks 6-7 are only allocated to $DDU_1$, and resource block 8 is allocated to $LSU_1$, $DDU_1$, and $DDU_2$. Thus, in this case, the reference sequence for $LSU_1$ will have a length of four resource blocks, while the reference sequence for $DDU_1$ will comprise three subsequences, where the first subsequence has a length of four resource blocks, the second subsequence has a length of two resource blocks, and the third subsequence has a length of one resource block. By using such subsequences during channel estimation, instead of the conventional reference sequences shown in FIG. 9, the joint channel estimator 200 is able to correlate signals over the full subsequences, and therefore, is able to maintain the desired correlation properties of the reference sequences.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of processing a composite wideband signal received at a local base station, the composite wideband signal including, over one or more frequency groups, at least one local signal associated with at least one locally scheduled user and at least one desired signal associated with at least one desired user scheduled by a neighboring base station, wherein the local base station receives scheduling information for the at least one desired user from the corresponding neighboring base stations, the method comprising:

estimating a combined local signal comprising all local signals in the composite wideband signal based on local scheduling information, wherein:
- the local scheduling information allocates a unique set of local frequencies to each of the at least one locally scheduled user;
- the received scheduling information allocates a set of desired frequencies to each of the at least one desired user; and
- at least one of the sets of desired frequencies at least partially overlaps at least one of the sets of local frequencies;

subtracting the combined local signal from the composite wideband signal to generate a combined desired signal; and detecting one or more of the desired signals in the composite wideband signal based on desired reference sequences allocated to the one or more desired users as indicated by the received scheduling information.

2. The method of claim 1 where estimating the combined local signal comprises:

generating smoothed channel estimates for each of the at least one locally scheduled user based on the composite wideband signal and a local reference sequence allocated by the local scheduling information to each locally scheduled user;

estimating each of the local signals in the composite wideband signal based on the corresponding smoothed channel estimates and the corresponding local reference sequence; and combining the estimated local signals to estimate the combined local signal.

3. The method of claim 1 wherein detecting the one or more desired signals comprises:

correlating the combined desired signal with each desired reference sequence to generate a desired signal estimate and a quality estimate for each desired user;

comparing each desired signal estimate to a threshold; and for each desired signal estimated that satisfies the threshold condition, detecting one or more of the desired signals based on the corresponding quality estimate.

4. The method of claim 3 wherein detecting the desired signals based on the corresponding quality estimate comprises identifying each desired signal whose desired signal estimated meets or exceeds the threshold and whose quality estimate satisfies a quality requirement as a detected desired signal.

5. A desired user detector in a local base station configured to process a composite wideband signal received at the local base station, the composite wideband signal including, over one or more frequency groups, at least one local signal associated with at least one locally scheduled user and at least one desired signal associated with at least one desired user scheduled by a neighboring base station, wherein the local base station receives scheduling information for the at least one desired user from the corresponding neighboring base stations, the desired user detector comprising:

a combined local signal estimator configured to estimate a combined local signal comprising all local signals in the composite wideband signal based on local scheduling information, wherein:
- the local scheduling information allocates a unique set of local frequencies to each of the at least one locally scheduled user;
- the received scheduling information allocates a set of desired frequencies to each of the at least one desired user; and
- at least one of the sets of desired frequencies at least partially overlaps at least one of the sets of local frequencies;

a subtractor configured to subtract the combined local signal from the composite wideband signal to generate a combined desired signal; and a detection processor configured to detect one or more of the desired signals in the composite wideband signal based on desired reference sequences allocated to the one or more desired users as indicated by the received scheduling information.

6. The desired user detector of claim 5 where the combined local signal estimator comprises:

a smooth channel estimator configured to generate smoothed channel estimates for each of the at least one locally scheduled user based on a local reference sequence allocated by the local scheduling information to each locally scheduled user;

a multiplier configured to estimate each of the local signals in the composite wideband signal based on the corresponding smoothed channel estimates and the corresponding local reference sequence; and a combiner configured to combine the estimated local signals to estimate the combined local signal.

7. The desired user detector of claim 5 wherein the detection processor comprises:

a plurality of correlators, each configured to correlate the combined desired signal with a different one of the desired reference sequences to generate a desired signal estimate and a quality estimate for each desired user;

a plurality of threshold units, each configured to compare the corresponding desired signal estimate to a threshold; and a screener configured to, for each desired signal estimated that satisfies the threshold condition, detect one or more of the desired signals based on the corresponding quality estimate.

8. The desired user detector of claim 7 wherein the screener is configured to detect the desired signals based on the corresponding quality estimate by identifying each desired signal whose desired signal estimated meets or exceeds the threshold and whose quality estimate satisfies a quality requirement as a detected desired signal.

9. A method of processing a composite wideband signal received at a local base station, the composite wideband signal including a plurality of user signals, each spanning one or more frequency groups of one or more resource blocks, wherein the frequency groups of different user signals at least partially overlap, and wherein the local base station has scheduling information for each of the user signals, the method comprising:

based on the scheduling information, identifying a first frequency bin of the composite wideband signal and determining a number of user signals present in the composite wideband signal in the first frequency bin;

identifying at least one additional, contiguous frequency bin in which the same user signals are present in the composite wideband signal such that the total number of identified frequency bins is greater than or equal to the number of user signals in the first frequency bin; and over the identified contiguous frequency bins, jointly calculating channel estimates for each of the user signals in the first frequency bin based on reference sequences allocated to a plurality of users corresponding to the user signals in the first frequency bin.

10. The method of claim 9 wherein jointly calculating channel estimates for each of the user signals in the first frequency bin based on the allocated reference sequences comprises for M identified frequency bins and N user signals, jointly solving a system of M equations and N unknowns, M≥N, where the N unknowns comprise channel estimates for the N user signals in the first frequency bin.

11. The method of claim 10 wherein M=N.

12. The method of claim 10 wherein, when the number of contiguous frequency bins containing the same user signals is less than N−1, further setting the channel estimates for each of the user signals in the first frequency bin and the contiguous frequency bins equal to the channel estimates determined for a previous frequency bin.

13. The method of claim 9 further comprising receiving at the local base station the scheduling information for at least one user reporting to a neighboring base station.

14. The method of claim 9 where in the plurality of users includes at least one locally scheduled user and at least one desired user, the method further comprising allocating reference sequences to each of the at least one locally scheduled user, each of the locally scheduled and desired users allocated one or more resource blocks within a transmission block by the corresponding scheduling information, wherein one or more of the granted resource blocks for different users overlap, the method comprising:
at the local base station, defining a plurality of intervals within the transmission block, wherein different intervals comprise different combinations of two or more users granted overlapping resource blocks, and wherein each interval has an interval length equal to the number of contiguous resource blocks in the interval;
for each interval, allocating a different subsequence to each locally scheduled user in the interval, each subsequence comprising a part of the corresponding reference sequence, and each allocated subsequence having a subsequence length equal to the interval length; and
generating the local reference sequence for each locally scheduled user based on the allocated subsequence(s).

15. The method of claim 14 further comprising sending a control signal to each neighboring base station controlling a desired user, the control signal instructing the neighboring base station to allocate the desired reference sequences to each of the desired users by:
defining a plurality of intervals within the transmission block, wherein different intervals comprise different combinations of two or more users granted overlapping resource blocks, and wherein each interval has an interval length equal to the number of contiguous resource blocks in the interval;
for each interval, allocating a different subsequence to each desired user in the interval, each subsequence comprising a part of the corresponding reference sequence, and each allocated subsequence having a subsequence length equal to the interval length; and
generating the desired reference sequence for each desired user based on the allocated subsequence(s).

16. A joint channel estimator configured to process a composite wideband signal received at a local base station, the composite wideband signal including a plurality of user signals, each spanning one or more frequency groups of one or more resource blocks, wherein the frequency groups of different user signals at least partially overlap, and wherein the local base station has scheduling information for each of the user signals, the joint channel estimator comprising:

a frequency bin identification processor configured to, based on the scheduling information:
identify a first frequency bin of the composite wideband signal and determine a number of user signals present in the composite wideband signal in the first frequency bin; and
identify at least one additional, contiguous frequency bin in which the same user signals are present in the composite wideband signal such that the total number of identified frequency bins is greater than or equal to the number of user signals in the first frequency bin; and
a scanning estimator configured to, over the identified contiguous frequency bins, jointly calculate channel estimates for each of the user signals in the first frequency bin based on reference sequences allocated to a plurality of users corresponding to the user signals in the first frequency bin.

17. The joint channel estimator of claim 16 wherein the scanning estimator is configured to jointly calculate channel estimates for each of the user signals in the first frequency bin based on the allocated reference sequences by, for M identified frequency bins and N user signals, jointly solving a system of M equations and N unknowns, M≥N, where the N unknowns comprise channel estimates for the N user signals in the first frequency bin.

18. The joint channel estimator of claim 17 wherein M=N.

19. The joint channel estimator of claim 17 wherein, when the number of contiguous frequency bins containing the same user signals is less than N−1, the scanning estimator is further configured to set the channel estimates for each of the user signals in the first frequency bin and the contiguous frequency bins equal to the channel estimates determined for a previous frequency bin.

20. A method of processing a composite wideband signal received at a local base station, the composite wideband signal including, over one or more frequency groups, at least one local signal associated with at least one locally scheduled user and at least one desired signal associated with at least one desired user scheduled by a neighboring base station, wherein the local base station receives scheduling information for the at least one desired user from the corresponding neighboring base stations, and wherein the frequency groups of different user signals at least partially overlap, the method comprising:
generating smoothed channel estimates for each of the at least one locally scheduled user having a local signal in the composite wideband signal based on local reference sequences respectively allocated to each of the at least one locally scheduled users by the local scheduling information;
detecting one or more of the at least one desired signal in the composite wideband signal based on the smoothed channel estimates and on desired reference sequences respectively allocated to each of the at least one desired user; and
over each frequency region having one or more overlapping frequency groups containing signals transmitted by a unique set of users, jointly calculating channel estimates for each of the user signals in the frequency region based on the corresponding allocated reference sequences.

21. The method of claim 20 further comprising averaging each of the jointly calculated channel estimates.

22. The method of claim 20 wherein detecting one or more of the at least one desired signal comprises:
estimating each of the local signals in the composite wideband signal based on the corresponding smoothed channel estimates and the corresponding allocated local reference sequence; and
combining the estimated local signals to estimate a combined local signal;
subtracting the combined local signal from the composite wideband signal to generate a combined desired signal; and
detecting one or more of the at least one desired signal in the composite wideband signal based on the combined desired signal and the desired reference sequences.

23. The method of claim 22 wherein detecting one or more of the at least one desired signal comprises:
correlating the combined desired signal with each desired reference sequence to generate a desired signal estimate and a quality estimate for each desired user;
comparing each desired signal estimate to a threshold; and
for each desired signal estimate that satisfies the threshold condition, detecting one or more of the at least one desired signal based on the corresponding quality estimate.

24. The method of claim 23 wherein detecting the at least one desired signal based on the corresponding quality estimate comprises identifying each desired signal whose desired signal estimate meets or exceeds the threshold and whose quality estimate satisfies a quality requirement as a detected desired signal.

25. The method of claim 20 wherein jointly calculating channel estimates comprises:
based on the scheduling information, identifying a first frequency bin of the composite wideband signal and determining a number of user signals present in the composite wideband signal in the first frequency bin;
identifying at least one additional, contiguous frequency bin in which the same user signals are present in the composite wideband signal such that the total number of identified frequency bins is greater than or equal to the number of user signals in the first frequency bin; and
over the identified contiguous frequency bins, jointly calculating channel estimates for each of the user signals in the first frequency bin based on reference sequences allocated to the users corresponding to the user signals in the first frequency bin.

26. The method of claim 25 wherein jointly calculating channel estimates for each of the user signals in the first frequency bin based on reference sequences allocated to the users comprises, for N user signals in the first frequency bin and M identified frequency bins, jointly solving a system of M equations and N unknowns, M≥N, where the N unknowns comprise channel estimates for the N user signals in the first frequency bin.

27. The method of claim 20 further comprising allocating reference sequences to each of the locally scheduled users, each of the locally scheduled and desired users allocated one or more resource blocks within a transmission block by the corresponding scheduling information, wherein one or more of the granted resource blocks for different users overlap, comprising:
at the local base station, defining a plurality of intervals within the transmission block, wherein different intervals comprise different combinations of two or more users granted overlapping resource blocks, and wherein each interval has an interval length equal to the number of contiguous resource blocks in the interval;
for each interval, allocating a different subsequence to each locally scheduled user in the interval, each subsequence comprising a part of the corresponding reference sequence, and each allocated subsequence having a subsequence length equal to the interval length; and
generating the local reference sequence for each locally scheduled user based on the allocated subsequence(s).

28. The method of claim 27 further comprising sending a control signal to each neighboring base station controlling a desired user, the control signal instructing the neighboring base station to allocate the desired reference sequences to each of the at least one desired user by:
defining a plurality of intervals within the transmission block, wherein different intervals comprise different combinations of two or more users granted overlapping resource blocks, and wherein each interval has an interval length equal to the number of contiguous resource blocks in the interval;
for each interval, allocating a different subsequence to each desired user in the interval, each subsequence comprising a part of the corresponding reference sequence, and each allocated subsequence having a subsequence length equal to the interval length; and
generating the desired reference sequence for each desired user based on the allocated subsequence(s).

29. A channel estimation system configured to process a composite wideband signal received at a local base station, the composite wideband signal including, over one or more frequency groups, at least one local signal associated with at least one locally scheduled user and at least one desired signal associated with at least one desired user scheduled by a neighboring base station, wherein the local base station receives scheduling information for the at least one desired user from the corresponding neighboring base stations, and wherein the frequency groups of different user signals at least partially overlap, the channel estimation system comprising:
a desired user detector configured to:
generate smoothed channel estimates for each of the at least one locally scheduled user having a local signal in the composite wideband signal based on local reference sequences respectively allocated to each locally scheduled user by the local scheduling information; and
detect one or more of the at least one desired signal in the composite wideband signal based on the smoothed channel estimates and on desired reference sequences respectively allocated to each desired user; and
a joint channel estimator configured to, over each frequency region having one or more overlapping frequency groups containing signals transmitted by a unique set of users, jointly calculate channel estimates for each of the user signals in the frequency region based on the corresponding allocated reference sequences.

30. The channel estimation system of claim 29 further comprising an averaging unit configured to average each of the jointly calculated channel estimates.

31. The channel estimation system of claim 29 wherein the desired user detector comprises:
a correlator configured to estimate each of the at least one local signal in the composite wideband signal based on the corresponding smoothed channel estimates and the corresponding allocated local reference sequence;
a combiner configured to combine the estimated local signals to estimate a combined local signal;
a subtractor configured to subtract the combined local signal from the composite wideband signal to generate a combined desired signal; and a detection processor configured to detect one or more of the at least one desired signal in the composite wideband signal based on the combined desired signal and the desired reference sequences.

32. The channel estimation system of claim 31 wherein the detection processor comprises:
a plurality of correlators, each configured to correlate the combined desired signal with a corresponding desired reference sequence to generate a desired signal estimate and a quality estimate for each desired user;
a plurality of threshold units configured to compare each desired signal estimate to a threshold; and
a screener configured to, for each desired signal estimate that satisfies the threshold condition, detect one or more of the desired signals based on the corresponding quality estimate.

33. The channel estimation system of claim 32 wherein the screener is configured to detect the desired signals based on the corresponding quality estimate by identifying each desired signal whose desired signal estimate meets or exceeds the threshold and whose quality estimate satisfies a quality requirement as a detected desired signal.

34. The channel estimation system of claim 29 wherein the joint channel estimator comprises:
a processor configured to:
based on the scheduling information, identify a first frequency bin of the composite wideband signal and determining a number of user signals present in the composite wideband signal in the first frequency bin; and
identify at least one additional, contiguous frequency bin in which the same user signals are present in the composite wideband signal such that the total number of identified frequency bins is greater than or equal to the number of user signals in the first frequency bin; and
a scanning estimator configured to, over the identified contiguous frequency bins, jointly calculate channel estimates for each of the user signals in the first frequency bin based on reference sequences allocated to the users corresponding to the user signals in the first frequency bin.

35. The channel estimation system of claim 34 wherein the scanning estimator jointly calculates channel estimates for each of the user signals in the first frequency bin based on reference sequences allocated to the users by, for N user signals in the first frequency bin and M identified frequency bins, jointly solving a system of M equations and N unknowns, M≥N, where the N unknowns comprise channel estimates for the N user signals in the first frequency bin.

36. The channel estimation system of claim 29 further comprising reference sequence allocator configured to allocate reference sequences to each of the at least one locally scheduled user, each of the locally scheduled and desired users allocated one or more resource blocks within a transmission block by the corresponding scheduling information, wherein one or more of the granted resource blocks for different users overlap, by:
at the local base station, defining a plurality of intervals within the transmission block, wherein different intervals comprise different combinations of two or more users granted overlapping resource blocks, and wherein each interval has an interval length equal to the number of contiguous resource blocks in the interval;
for each interval, allocating a different subsequence to each locally scheduled user in the interval, each subsequence comprising a part of the corresponding reference sequence, and each allocated subsequence having a subsequence length equal to the interval length; and
generating the local reference sequence for each locally scheduled user based on the allocated subsequence(s).

37. The channel estimation system of claim 36 further comprising a transceiver configured to send a control signal to each neighboring base station controlling a desired user, the control signal instructing the neighboring base station to allocate the desired reference sequences to each of the desired users by:
defining a plurality of intervals within the transmission block, wherein different intervals comprise different combinations of two or more users granted overlapping resource blocks, and wherein each interval has an interval length equal to the number of contiguous resource blocks in the interval;
for each interval, allocating a different subsequence to each desired user in the interval, each subsequence comprising a part of the corresponding reference sequence, and each allocated subsequence having a subsequence length equal to the interval length; and
generating the desired reference sequence for each desired user based on the allocated subsequence(s).

38. A method of allocating reference sequences to each of a plurality of users in a wireless communication network, each of said plurality of users allocated one or more resource blocks within a transmission block by scheduling information corresponding to each user, wherein one or more of the allocated resource blocks for different users overlap, the method comprising:
defining, in a processor of a reference sequence allocator, a plurality of intervals within the transmission block, wherein different intervals comprise different combinations of two or more users granted overlapping resource blocks, and wherein each interval has an interval length equal to the number of contiguous resource blocks in the interval;
for each interval, allocating, in the processor, a different subsequence to each user in the interval, each subsequence comprising a part of the corresponding reference sequence, and each allocated subsequence having a subsequence length equal to the interval length; and
generating, in the processor, a reference sequence for each user based on the allocated subsequence(s).

39. The method of claim 38 further comprising identifying one or more resource blocks not included in the defined intervals, and allocating additional different subsequences to each user granted these resource blocks, each additional different subsequence comprising a part of the corresponding reference sequence, and each additional different subsequence having a length equal to the number of corresponding consecutive resource blocks.

40. The method of claim 39 wherein generating a reference sequence based on the allocated subsequences comprises concatenating the allocated subsequences.

41. A reference sequence allocator configured to allocate reference sequences to each of a plurality of users in a wireless communication network, each of said plurality of users allocated one or more resource blocks within a transmission block by scheduling information corresponding to each user, wherein one or more of the allocated resource blocks for different users overlap, the reference sequence allocator comprising:
a processor coupled to a memory configured to:
define a plurality of intervals within the transmission block, wherein different intervals comprise different combinations of two or more users granted overlapping resource blocks, and wherein each interval has an interval length equal to the number of contiguous resource blocks in the interval;

for each interval, allocate a different subsequence to each user in the interval, each subsequence comprising a part of the corresponding reference sequence, and each allocated subsequence having a subsequence length equal to the interval length; and generate a reference sequence for each user based on the allocated subsequence(s).

42. The reference sequence allocator of claim 41 wherein the processor is further configured to identify one or more resource blocks not included in the defined intervals, and allocating additional different subsequences to each user granted these resource blocks, each additional different subsequence comprising a part of the corresponding reference sequence, and each additional different subsequence having a length equal to the number of corresponding consecutive resource blocks.

43. The reference sequence allocator of claim 42 wherein the processor generates a reference sequence based on the allocated subsequences by concatenating the allocated subsequences.

* * * * *

UNITED STATES PATENT AND TRADEMARK OFFICE
CERTIFICATE OF CORRECTION

PATENT NO.          : 8,917,688 B2
APPLICATION NO.     : 13/667053
DATED               : December 23, 2014
INVENTOR(S)         : Comeau et al.

Page 1 of 1

It is certified that error appears in the above-identified patent and that said Letters Patent is hereby corrected as shown below:

On The Title Page

On Page 2, in Item (56), under "OTHER PUBLICATIONS", in Column 1, Line 1, delete "Bourdreau," and insert -- Boudreau, --, therefor.

In The Specification

In Column 5, Line 31, delete "UES." and insert -- UEs. --, therefor.

In Column 7, Line 44, delete "$(S_{ap})$" and insert -- $(S_{d,p})$ --, therefor.

In Column 8, Line 59, delete "estimator 230" and insert -- estimator 240 --, therefor.

In Column 9, Line 13, delete "estimator 230" and insert -- estimator 240 --, therefor.

In The Claims

In Column 11, Line 23, in Claim 2, delete "where" and insert -- wherein --, therefor.

In Column 12, Line 16, in Claim 6, delete "where" and insert -- wherein --, therefor.

In Column 13, Line 20, in Claim 14, delete "where in" and insert -- wherein --, therefor.

Signed and Sealed this
Third Day of May, 2016

Michelle K. Lee
*Director of the United States Patent and Trademark Office*